United States Patent [19]

Hutter et al.

[11] Patent Number: 5,473,006
[45] Date of Patent: Dec. 5, 1995

[54] POLYVINYL ALCOHOL-MODIFIED ROSIN-BASED EMULSION POLYMERS

[75] Inventors: G. Frederick Hutter, Charleston; Paul J. Zuraw, Mt. Pleasant, both of S.C.

[73] Assignee: Westvaco Corporation, New York, N.Y.

[21] Appl. No.: 225,637

[22] Filed: Apr. 11, 1994

[51] Int. Cl.$^6$ .............................. C08F 2/22; C08L 93/04
[52] U.S. Cl. .................. 524/459; 524/272; 524/270; 524/457; 524/503
[58] Field of Search ...................... 524/457, 459, 524/503, 272, 270

[56] References Cited

U.S. PATENT DOCUMENTS

| | | | |
|---|---|---|---|
| 2,994,635 | 8/1961 | Reaville et al. | 162/179 |
| 4,018,732 | 4/1977 | Lakshmanan | 524/425 |
| 4,529,787 | 7/1985 | Schmidt et al. | 526/317 |
| 4,820,762 | 4/1989 | Tsaur | 524/460 |
| 4,839,413 | 6/1989 | Kiehlbauch et al. | 524/460 |
| 4,939,190 | 7/1990 | Tomioka et al. | 523/206 |
| 4,954,558 | 9/1990 | Tsaur | 524/460 |
| 5,216,064 | 6/1993 | Rivera et al. | 524/457 |
| 5,380,769 | 1/1995 | Titterington et al. | 524/272 X |
| 5,389,403 | 2/1995 | Buckley et al. | 524/503 X |

*Primary Examiner*—Judy M. Reddick
*Attorney, Agent, or Firm*—Daniel B. Reece, IV; Terry B. McDaniel; Richard L. Schmalz

[57] ABSTRACT

The invention relates to polyvinyl alcohol-modified, rosin-based, resin-fortified emulsion polymer compositions having improved properties which are useful in formulating gravure and flexographic printing inks. Additionally, the invention relates to the method of preparing these emulsion polymer compositions.

21 Claims, No Drawings

POLYVINYL ALCOHOL-MODIFIED ROSIN-BASED EMULSION POLYMERS

FIELD OF INVENTION

The invention relates to polyvinyl alcohol-modified, rosin-based, resin-fortified emulsion polymer compositions having improved properties which are useful in formulating gravure and flexographic printing inks, Additionally, the invention relates to the method of preparing these emulsion polymer compositions.

BACKGROUND OF THE INVENTION

Acrylic latices used in the production of printing inks often contain what is called a support resin. These water and alkaline soluble (at pHs of about 8) resins are added to the emulsion polymerization reaction to improve the stability and rheological properties of the latex. Improved stability results from adsorption of the resin on the surface of the particles and the increased viscosity of the emulsion.

High molecular weight emulsion polymers are widely used in the coatings industry. However, several problems are associated with high molecular weight emulsion polymer technology, including: poor wetting of metal and plastic substrates, cratering of resulting films, low gloss or mud-caking of resulting films, wetting and adherency problems, mechanical instability, freeze-thaw instability, shear thinning, and poor physical properties of the resulting film. U.S. Pat. No. 4,839,413 (which is hereby incorporated by reference) attempts to address and overcome these problems by employing hard acrylic resins as support resins.

Such hard acrylic resins have become the support resins most commonly used by the ink industry. However, as these resins are relatively expensive, ink formulators are actively searching for low cost alternatives.

One such alternative is taught by Rivera and Zuraw in commonly assigned U.S. Pat. No. 5,216,064 (which is hereby incorporated by reference). In this patent the authors teach alkali-soluble rosin-based support resins for use in producing emulsion polymer compositions. These compositions are subsequently employed to formulate inks suitable for use in gravure printing. However, the inks taught in this patent have relatively low viscosities and are, therefore, unsuitable for use in flexographic printing applications.

Another alternative to hard acrylic resins is taught by Hutter in the commonly assigned, allowed, patent application Ser. No. 07/987,794 filed Dec. 9, 1992 and now U.S. Pat. No. 5,306,762 (which is hereby incorporated by reference). This application teaches the incorporation of both amide-containing monomers and non amide-containing monomers into the emulsion polymer compositions of U.S. Pat. No. 5,216,064; thereby producing improved ink formulations which exhibit enhanced peel strengths for gravure laminating inks. However, the inks taught in this patent have also proven to be unsuitable for flexographic printing because of low viscosities.

Therefore, it is the object of this invention to utilize low cost alkali-soluble support resins to produce emulsion polymer compositions for use in formulating inks suitable for use in flexographic printing applications.

SUMMARY OF THE INVENTION

The object of this invention is met by the development of rosin-based support resins for use in producing emulsion polymer compositions. These resins are produced from rosin fortified via a Dieis-Alder reaction with fumaric acid or maleic anhydride (or a combination of the two), followed by esterification of the fortified rosin with a polyol or a combination of polyols. The rosin-based resins are subsequently used as support resins in emulsion polymerization reactions with a monomer (or combination of monomers) and a polyvinyl alcohol to produce emulsion polymer compositions useful in formulating printing inks for flexographic printing applications.

Not only are rosin support resins less expensive than traditional acrylic support resins, but the rosin resins have other advantages as well. It has been found that rosin supported latices show a substantial improvement in ink gloss when compared to acrylic supported latices. Also, high rosin resin fortified emulsion polymers can be used at higher solids content levels than acrylic fortified emulsion polymers at similar viscosities. This is important because it allows the formulation of higher solids inks, which dry faster than lower solids inks. A further advantage is the elimination of the residual glycol that is present in most acrylic support resins. Acrylic resins typically contain up to 8% residual glycol ether solvent, which is considered undesirable for environmental reasons.

Finally, gravure inks formulated with these polymer emulsion products exhibit superior printability characteristics.

As mentioned, the invention is directed to polyvinyl alcohol-modified, rosin-based emulsion polymer compositions and the method for preparing the same. In addition, the invention is also directed to ink formulations containing such emulsion polymers.

DESCRIPTION OF THE PREFERRED EMBODIMENT

The rosin-based support resins are produced by the fortification of rosin followed by esterification with a polyol or a combination of polyols. Rosins which are suitable for use in the reaction include, but are not limited to, the following:

wood rosin, tall oil rosin, and gum rosin.

Tall oil rosin is preferred, more preferably, fortified tall oil rosin made by reaction or mixing with the rosins varying amounts of fumaric acid, maleic anhydride, maleic acid, or combinations thereof. Fortification of rosin via a Dieis-Alder reaction is well known in the art, as evidenced by U.S. Pat. No. 2,994,635 (which is hereby incorporated by reference).

Polyols which are suitable for use in esterification reaction with the fortified rosin include, but are not limited to, the following:

glycerol, sorbitol, pentaerythritol, diethylene glycol, polyethylene glycols, styrene-allyl alcohol copolymer, and combinations thereof.

(Styrene-allyl alcohol copolymer is a hard thermoplastic, low molecular weight polymer manufactured by Arco, Inc.) Polyethylene glycols which are suitable for use in the reaction have an average molecular weight in the range of 100 to 10,000.

The method for producing the desired rosin-based support resins comprises reacting in an esterification reaction from 60 to 98% by weight of fumarated rosin or maleated rosin (or a combination thereof) with from 2 to 40% by weight of a polyol or combination of polyols. Preferably, the rosin is reacted with sufficient fumaric acid (or maleic anhydride) to consume the available abietic-type isomers. The abietic-type isomers are known chain stoppers in free radical polymerization reactions.

The acid number of the rosin-based support resin affects the properties of the emulsion polymer. A suitable acid number for a rosin-based support resin is in the range of about 120 to 250, with the preferred range being 150 to 200.

The rosin-based support resins are added to emulsion polymerization reactions to produce emulsion polymers (which are, in turn, utilized to formulate printing inks). An emulsion polymer is a high molecular weight polymer finely dispersed in water in the form of particles. Such polymers are formed by the polymerization of monomers capable of undergoing free radical emulsion polymerization. The procedures for producing emulsion polymers are well known to those skilled in the art (as evidenced by U.S. Pat. No. 4,839,413). The average molecular weight of polymers prepared using emulsion polymerization is usually greater than polymers made using solution or bulk polymerization methods. Typically, emulsion polymers have an average molecular weight in the range of 200,000 to 1,000,000.

In practicing the present invention, it is preferable to add the rosin-based support resin to the emulsion polymerization reaction mixture prior to initiation of the polymerization. The resin can be added as a solid, a solution, or slurry (although addition of a resin as a solution is preferred). The monomers employed in the emulsion polymerization reaction can be added to the reaction mixture in either a single stage addition or in a multi-stage addition.

In conducting the present emulsion polymerization reaction, known emulsion polymerization techniques may be employed. Also, standard anionic and nonionic surfactants are utilized in the polymerization reaction as needed to prevent coagulation of the emulsion particles. Preferably, the reaction is conducted at an elevated temperature of from about 60° to 100° C., at ambient pressure and under an inert atmosphere such as nitrogen. The reaction mixture is maintained under agitation employing standard mixing techniques.

The method for producing the desired polymer emulsion product comprises reacting in a polymerization reaction:

1) 4.9 to 32.0% by weight of the support resin, 2) 0.1 to 8.0% by weight of a polyvinyl alcohol, 3) 0.2 to 2.0% by weight of an initiator, 4) 1.0 to 12.0% by weight of a surfactant, and 5) 46.0 to 93.8% by weight of a monomer (or combination of monomers).

The improvement in this application's method over the teachings contained in commonly assigned U.S. Pat. No. 5,216,064 and patent application Ser. No. 07/987,794 filed Dec. 9, 1992 and now U.S. Pat. 5,306,762 lies in the partial substitution of a polyvinyl alcohol (or combination of polyvinyl alcohols) for the support resin in the polymerization reaction. Polyvinyl alcohols which are suitable for use in the preparation of the present polymer emulsion products have a molecular weight average in the range of about 10,000 to 120,000, and a degree of hydrolysis of between 80 to 100%.

Initiators which are suitable for use in the preparation of the present polymer emulsion products include, but are not limited to, the following: ammonium persulfate, potassium persulfate, sodium persulfate, and combinations thereof.

Surfactants which are suitable for use in the preparation of the present polymer emulsion products include, but are not limited to, the following: sulfated alkylphenoxypoly(ethyleneoxy)ethanol, octylphenoxypoly(ethyleneoxy)ethanol, and combinations thereof.

The monomers employed in the preparation of the present polymer emulsion products are any monomers used in emulsion polymerization reactions. Suitable monomers include ethylenically unsaturated monomers such as olefins, mono vinylidene aromatics, alpha, betaethylenically unsaturated carboxylic acids and esters thereof, ethylenically unsaturated dicarboxylic anhydrides and halo substituted olefinics. Further suitable monomers include, but are not limited to, the following: styrene, alpha methylstyrene, acrylic acid, methacrylic acid, methyl methacrylate, butyl methacrylate, butyl acrylate, 2-ethylhexyl acrylate, ethyl acrylate, hydroxyethyl acrylate, and hydroxyethyl methacrylate.

To create inks with enhanced peel strengths for laminating inks, it is preferred to react both amide-containing and non amide-containing monomers in the polymerization reaction. Here, about 31.0 to 93.3% by weight of the polymerization reactants are non amide-containing monomers. Suitable non-amide containing monomers include ethylenically unsaturated monomers such as olefins, monovinylaromatics, alpha, beta-ethylenically unsaturated carboxylic acids and esters thereof, ethylenically unsaturated dicarboxylic anhydrides and halo substituted olefinics. Specific examples of these non-amide containing monomers include, but are not limited to, the following: styrene, alpha-methylstyrene, acrylic acid, methacrylic acid, methyl methacrylate, butyl methacrylate, butyl acrylate, 2-ethylhexyl acrylate, ethyl acrylate, hydroxyethyl acrylate, and hydroxyethyl methacrylate.

Additionally, about 0.5 to 15.0% by weight of the polymerization reactants are amide-containing monomers. Suitable amide-containing monomegs include acrylamide or substituted acrylamide monomers of the general formula $CH_2=C(R^1)CON(R^2)(R^3)$, where $R^1$ is hydrogen or a methyl group, $R^2$ is hydrogen or a methyl group, and $R^3$ is hydrogen or an alkyl, hydroxyalkyl, alkoxyalkyl, ketoalkyl, or aryl group containing from 1 to 18 carbon atoms. Other suitable amide-containing monomers include N-vinyllactam monomers of the general formula

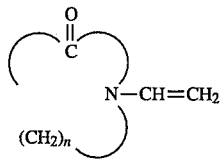

where n is 3, 4, or 5. Specific examples of these amide-containing monomers include, but are not limited to, the following: acrylamide, methacrylamide, diacetone acrylamide, N-methylolacrylamide, N-isobutoxymethylacrylamide, N-dodecylacrylamide, N,N-dimethylacrylamide, N-vinylpyrrolidinone, and N-vinylcaprolactam.

The pH at which emulsion polymers are prepared effects their stability. The suitable pH range for use in the present polymerization reactions is from about 7.5 to 10.0, with the preferred range being 8.0 to 9.0.

As appreciated in the art, the exact components and properties of components desired for any given ink application can vary, and, therefore, routine experimentation may be required to determine the optional components and proportions of components for a given application and desired properties.

The following examples are provided to further illustrate the present invention and are not to be construed as limiting the invention in any manner.

EXAMPLE 1

A rosin-based support resin was produced via the following procedure. Into a 1000 ml three-neck round bottom flask was melted 400.0 g of ROSIN SS (a tall oil-based rosin manufactured by Westvaco, Inc.). The flask was equipped with a Dean Stark trap, condenser, nitrogen inlet, thermocouple, heating mantle, and heating tape. Fumaric acid (100.0 g) was added to the molten rosin at 150° C., and this mixture was heated to 200° C. and stirred for three hours. At this time glycerol (38.8 g) was slowly added to the rosin, and the resulting mixture was stirred for three hours at 200° C. before cooling and collecting the rosin-based support resin.

The rosin-based support resin was used to formulate an emulsion polymer. A 25% solids solution was produced by dissolving 250.5 g of the support resin and 21.8 g of AIRVOL® 107 (a polyvinyl alcohol having a molecular weight of between 31,000–50,000 manufactured by Air Products, Inc.) in deionized (DI) water and ammonium hydroxide, and subsequently filtering the solution under vacuum through a #4 paper filter. A 2-liter reaction flask was charged with the polyvinyl alcohol-resin solution, 13.0 g of IGEPAL® CA-897 (an ionic surfactant manufactured by GAF, Inc.), and 13.0 g of ABEX® EP-120 (an anionic surfactant manufactured by Rhône-Poulene, Inc.). The mixture was heated under a nitrogen blanket, with stirring, to a temperature of 85° C. This temperature was maintained throughout the reaction.

A 1-liter flask was charged with 156.0 g of styrene and 138.0 g of butyl acrylate. These non-amide-containing monomers were stirred until mixed.

At this time 1.3 g of ammonium persulfate and 4.0 g of DI water were added to the 2-liter reaction flask, followed by 30.0 g of the non-amide monomer mixture. After 20 minutes, the remainder of the non-amide monomer mixture was added to the reaction over a period of 2 hours. Concurrently, 4.5 g of N-Methylol-acrylamide (an amide-containing monomer) was separately added to the reaction over the same 2 hour period. One hour into the addition of the monomers 1.3 g of ammonium persulfate and 4.0 g of DI water were added to the reactor. When the addition of the monomers was complete, the reaction was held for 30 minutes, after which time 0.4 g of ammonium persulfate and 3.0 g of DI water were added to the reactor to consume any remaining monomer. The reaction was maintained at 85° C. for two hours, then cooled to 45° C. The resulting emulsion polymer was measured to have a solids level of 44.3% and a Brookfield viscosity of 493.0 cP.

For purposes of evaluation a control emulsion polymer was made via the procedure outlined above, except that: 1) the amount of support resin reacted was increased from 250.5 g to 272.3 g and 2) no polyvinyl alcohol was added to the reaction. The resulting control emulsion polymer was measured to have a solids level of 48.0% and a Brookfield viscosity of only 81.3 cP.

EXAMPLE 2

Rosin-based support resins were produced via the following procedure. All formulae and procedures are given in parts by weight of reactants. Into a 1000 ml three-neck round bottom flask was melted 100.0 parts of ROSIN SS (a tall oil-based rosin manufactured by Westvaco, Inc.). The flask was equipped with a Dean Stark trap, condenser, nitrogen inlet, thermocouple, heating mantle, and heating tape. Fumaric acid (26.0 parts) was added to the molten rosin at 150° C., and this mixture was heated to 200° C. and stirred for three hours. At this time glycerol (9.3 parts) was slowly added to the rosin, and the resulting mixture was stirred for three hours at 200° C. before cooling and collecting the rosin-based support resin.

Using the following procedure a series of five emulsion polymer compositions were produced wherein the amount and types of polyvinyl alcohol utilized were varied. To five four-neck distilling flasks equipped with mechanical stirrers were added the following:

Flask 1: 23.00 parts of support resin dissolved in 132.00 parts of DI water;

Flask 2: 20.70 parts of support resin and 2.30 parts of polyvinyl alcohol (fully hydrolyzed with a molecular weight of 77,000–79,000 manufactured by Aldrich, Inc.) dissolved in 132.00 parts of DI water;

Flask 3: 21.85 parts of support resin and 1.15 parts of polyvinyl alcohol (fully hydrolyzed with a molecular weight of 77,000–79,000 manufactured by Aldrich, Inc.) dissolved in 132.00 parts of DI water;

Flask 4: 21.85 parts of support resin and 1.15 parts of polyvinyl alcohol (AIRVOL® 325, fully hydrolyzed with a molecular weight of 85,000–146,000 manufactured by Air Products, Inc.) dissolved in 132.00 parts of DI water;

Flask 5: 21.16 parts of support resin and 1.84 parts of polyvinyl alcohol (AIRVOL® 325, fully hydrolyzed with a molecular weight of 85,000–146,000 manufactured by Air Products, Inc.) dissolved in 132.00 parts of DI water.

The pH of the resin solutions were set at about 8.5 with the required amounts of ammonium hydroxide. To each resin mixture was added 5.0 parts of a sulfated alkylphenoxypoly-(ethyleneoxy)ethanol surfactant in 11.7 parts DI water, and 3.0 parts octylphenoxypoly(ethyleneoxy)ethanol surfactant in 1.3 parts DI water. The mixtures were heated under nitrogen blankets to 85° C.

Ten percent of a monomer blend of 95.0 parts styrene and 5.0 parts butyl acrylate was added to each flask, followed by the addition of 0.44 parts ammonium persulfate in 1.3 parts DI water. These initial charges of monomer were allowed to react for 30 minutes. The remaining monomer was then added over a period of 120 minutes. An additional 0.44 parts ammonium persulfate in 1.3 parts DI water was added to each flask 60 minutes into the addition of the remaining monomer. When the monomer was completely added to each flask the emulsions were held at 85° C. for 30 minutes, and then 0.13 parts of ammonium persulfate was added. The emulsions were stirred for 120 minutes at 85° C. before being cooled and filtered. The final pH of each emulsion was adjusted to about 8.3–8.8 with the required amounts of ammonium hydroxide. The viscosities of the five emulsions are listed in Table I below.

TABLE I

| Polyvinyl Alcohol-Modified Rosin-Based Emulsion Polymers | | | | | |
|---|---|---|---|---|---|
| PVOH[1] | Ctl.[2] 0% | Ald. 10% | Ald. 5% | 325 5% | 325[3] 8% |
| Solids (wt %) | 49.8 | 47.7 | 47.4 | — | 46.3 |
| Viscosity[3] (cPs) | 71 | 1950 | 363 | 384 | 1800 |
| pH | 8.3 | 8.8 | 8.3 | 8.4 | 8.4 |

[1]Percent of support resin replaced by polyvinyl alcohol (PVOH).
[2]Ctl. = Control emulsion (no PVOH added). Ald. = Fully hydrolyzed PVOH with a mol. wt. of 77,000–79,000 from Aldrich, Inc. 325 = AIRVOL 325 (fully hydrolyzed PVOH with a mol. wt of 85,000–146,000 from Air Products, Inc.).
[3]PVOH-Emulsion formulation utilized below to make inks (hereafter referred to as PVOH-1).

The base ink formulation shown in Table II below (which is useful for both flexographic and gravure printing applications) was used to evaluate PVOH-1 in combination with MOREZ® 101 (a styrene/acrylic acid copolymer manufactured by Morton International, Inc.) and JONREZ® D-2106 (an acrylic colloidal dispersion manufactured by Westvaco, Inc.). Alkaline solutions (25% solids) were made with each of these resins and either 5 or 10 parts of the solution was added based on 100 parts of the ink formulation shown in Table II. The addition of five and ten parts of a 25% solids alkali-solution, based on 100 parts ink, is equivalent to adding 7.8 and 15.6 parts, respectively, of solid resin based on 100 parts acrylic emulsion polymer.

TABLE II

| Ink Formulation | |
|---|---|
|  | Parts |
| Emulsion Polymer | 45.5 |
| Flexiverse Blue Pigment | 38.3 |
| Neptune N1 Wax | 1.0 |
| Isopropanol | 3.8 |
| Water | 11.4 |
| Total | 100.0 |

Inks were made by gently mixing the pigment with water. Next, the wax and let-down vehicle were added. The inks were then gently agitated while adding isopropanol and allowed to equilibrate overnight. The target viscosity for these inks was 20 seconds in a Zahn #2. Those with higher viscosity were remade with less let-down vehicle. The initial ink viscosity is given in Table III. Inks formulated with JONCRYL® 89 (a acrylic latex manufactured by S.C. Johnson and Son, Inc.) and PVOH-1 with post-added D-2106 were adjusted to obtain the needed viscosity. The value under cut (Table III) indicates the percent less let-down vehicle by weight added. For example, the ink made with JONCRYL 89 (J-89) contained 5% less let-down vehicle and an equal amount of additional water compared with the ink formulation in Table II. Inks formulated with PVOH-1 and D-2106 were cut 10%.

TABLE III

| Ink Formulations and Viscosities | | | | | | |
|---|---|---|---|---|---|---|
| | POST-ADD RESIN | | ZAHN #2 VISCOSITY (sec) | | | WATER |
| INKS | TYPE | PARTS | INITIAL | CUT (%) | FINAL | RESISTANCE |
| J-89 | — | — | 22 | 5 | 20 | 1 |
| PVOH-1 | — | — | 21 | 0 | 21 | 3 |
| PVOH-1 | MOREZ | 5 | 20 | 0 | 20 | 3 |
| PVOH-1 | MOREZ | 10 | 20 | 0 | 20 | 3 |
| PVOH-1 | D-2106 | 5 | 24 | 10 | 19 | 3 |
| PVOH-1 | D-2106 | 10 | 25 | 10 | 19 | 1 |

Water resistance was determined by casting the inks on PRINTKOTE® (a paper manufactured by Westvaco, Inc.) stock with an RDSO9 applicator rod and air drying the drawdowns for 24 hours. Two drops of water were placed on the prints and held for ten minutes. The water was then wiped off with a Kimwipe. The amount of ink removed was designated by visual inspection of the Kimwipe and a value assigned from 0 to 5. Zero indicates that no ink was transferred to the Kimwipe and, therefore, indicates the best water resistance. Five indicates substantial ink removal.

As shown in Table III, the water resistance of inks formulated with PVOH-1 was improved with the post-addition of 10 parts D-2106.

Following the ink formulation listed in Table II, a series of 3 water gravure inks were made using different let-down vehicles: 1) all acrylic emulsion polymer (JONCRYL-89), 2) polyvinyl alcohol-modified rosin/acrylic emulsion polymer (PVOH-1), and 3) rosin/acrylic emulsion polymer (the Control emulsion of Table I). The inks were evaluated, and the results are listed in Table IV below.

TABLE IV

Water Gravure Inks

| | | | INK PROPERTIES | | | |
|---|---|---|---|---|---|---|
| | | | PRINTKOTE (2) RDS ROD | | SUPERCAL (3) K-COATER | |
| VEHICLE TYPE | (1) SOLID % | SHELL #2 (sec) | 60' GLOSS | WATER RESIST | 60' GLOSS | PRINT QUALITY |
| NONFILM FORMING EMULSION POLYMERS | | | | | | |
| JONCRYL 89 | 31.1 | 19.2 | 21 | 1 | 11 | 0 |
| PVOH-1 | 32.4 | 18.1 | 22 | 4 | 11 | 0 |
| CONTROL | 36.6 | 18.3 | 23 | 3 | 11 | −2 |

1. Solids calculated based on measured solids of vehicle and pigment dispersion. Differences in solids are due to different levels of vehicle used to obtain the target viscosity.
2. Inks were cast with an RDS07 rod.
3. Inks were cast with St. Johns gravure K-proofer. The printability was rated relative to ink made with JONCRYL 89. Ink made with JONCRYL 89 was rated 0. Negative numbers indicate poorer printability.

The gravure ink made with the polyvinyl alcohol-modified rosin/acrylic emulsion polymer (PVOH-1) had gloss, printability, and dilution qualities similar to ink made with the acrylic emulsion polymer (JONCRYL 89). While its water resistance in this formula was somewhat inferior when compared to the ink made with J-89, water resistance in this type of application is not as important a factor as resolubility. Indeed, lower water resistance may indicate better resolubility.

The gravure ink made with the polyvinyl alcohol-modified rosin/acrylic emulsion polymer (PVOH-1) had greatly improved printability when compared to the rosin/acrylic emulsion polymer (Control emulsion).

Many modifications and variations of the present invention will be apparent to one of ordinary skill in the art in light of the above teachings. It is therefore understood that the scope of the invention is not to be limited by the foregoing description, but rather is to be defined by the claims appended hereto.

What is claimed is:

1. An improved method for the production of an aqueous polymer emulsion product having a pH value in the range of 7.5 to 10.0, which comprises reacting in an esterification reaction:

(A) 60.0 to 98.0% by weight of a member selected from the group consisting of fumarated rosin, maleated rosin, and combinations thereof, and (B) 2.0 to 40.0% by weight of a polyol to produce a rosin-based support resin having an acid number in the range of 120 to 250; and further reacting in a polymerization reaction:

(1) 0.2 to 2.0% by weight of the total composition of an initiator;

(2) 1.0 to 12.0% by weight of the total composition of a surfactant;

(3) 46.0 to 93.8% by weight of the total composition of a monomer;

(4) 4.9 to 32.0% by weight of the total composition of said support resin; and wherein the improvement comprises also reacting in the polymerization reaction from (5) 0.1 to 8.0% by weight of the total composition of a polyvinyl alcohol having a molecular weight average in the range of about 10,000 to about 120,000, and a degree of hydrolysis based on mole % of between 80 and 100%, to produce the aqueous polymer emulsion product.

2. The method of claim 1 which comprises reacting in the esterification reaction:

(A) 75.0 to 98.0% by weight of a member selected from the group consisting of fumarated rosin, maleated rosin, and combinations thereof, and (B) 2.0 to 25.0% by weight of a polyol to produce a rosin-based support resin having an acid number in the range of 120 to 250; and further reacting in the polymerization reaction:

(1) 0.4 to 1.0% by weight of the total composition of an initiator;

(2) 2.0 to 8.0% by weight of the total composition of a surfactant;

(3) 61.0 to 87.6% by weight of the total composition of a monomer;

(4) 9.9 to 22.0% by weight of the total composition of said support resin; and wherein the improvement comprises also reacting in the polymerization reaction from (5) 0.1 to 8.0% by weight of the total composition of a polyvinyl alcohol having a molecular weight average in the range of about 10,000 to about 120,000, and a degree of hydrolysis based on mole % of between 80 and 100%, to produce the aqueous polymer emulsion product.

3. The method of claim 1 wherein the polyol is selected from the group consisting of glycerol, sorbitol, pentaerythritol, neopentyl glycol, ethylene glycol, polyethylene glycols having an average molecular weight in the range of 100–10,000, and combinations thereof.

4. The method of claim 1 wherein the acid number of the rosin-based support resin is in the range of 150 to 200.

5. The method of claim 1 wherein the monomer is selected from the group consisting of styrene, alphamethylstyrene, acrylic acid, methacrylic acid, methyl methacrylate, butyl methacrylate, butyl acrylate, 2-ethylhexyl acrylate, ethyl acrylate, hydroxyethyl acrylate, hydroxyethyl methacrylate, polyethylene glycol monomethacrylate, and combinations thereof.

6. The method of claim I wherein the initiator is selected from the group consisting of ammonium persulfate, potassium persulfate, sodium persulfate, and combinations thereof.

7. The method of claim 1 wherein the surfactant is selected from the group consisting of sulfated alkylphenoxypoly(ethyleneoxy) ethanol, octylphenoxypoly(ethyleneoxy) ethanol, diethylene glycol, and combinations thereof.

8. The method of claim 1 wherein the pH of the polymer emulsion product is in the range of 8.0 to 9.0.

9. The polymer emulsion product of the method of claim 1.

10. A water-based ink comprising the polymer emulsion product of claim 9 and a pigment dispersion.

11. An improved method for the production of an aqueous polymer emulsion product having pH values in the range of 7.5 to 10.0, which comprises reacting in an esterification reaction:

(A) 60.0 to 98.0% by weight of a member selected from the group consisting of fumarated rosin, maleated rosin, and combinations thereof, and (B) 2.0 to 40.0% by weight of a polyol to produce a rosin-based support resin having an acid number in the range of 120 to 250; and further reacting in a polymerization reaction:

(1) 0.2 to 2.0% by weight of the total composition of an initiator;

(2) 1.0 to 12.0% by weight Of the total composition of a surfactant;

(3) 31.0 to 93.3% by weight of the total composition of a non amide-containing monomer;

(4) 0.5 to 15.0% by weight of the total composition of an amide-containing monomer selected from the group consisting of monomers of the formula

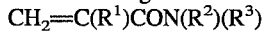
$CH_2=C(R^1)CON(R^2)(R^3)$ where $R^1$ is hydrogen or a methyl group, $R^2$ is hydrogen or a methyl group, and $R^3$ is hydrogen or an alkyl, hydroxyalkyl, alkoxyalkyl, ketoalkyl, or aryl group containing from 1 to 18 carbon atoms, monomers of the formula

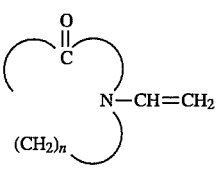

where n is 3, 4, or 5, and combinations thereof;

(5) 4.9 to 32.0% by weight of the total composition of said support resin; and wherein the improvement comprises also reacting in the polymerization reaction from (6) 0.1 to 8.0% by weight of the total composition of a polyvinyl alcohol having a molecular weight average in the range of about 10,000 to about 120,000, and a degree of hydrolysis based on the mole % of between 80 and 100%, to produce the aqueous polymer emulsion product.

12. The method of claim 11 which comprises reacting in the esterification reaction:

(A) 75.0 to 98.0% by weight of a member selected from the group consisting of fumarated rosin, maleated rosin, and combinations thereof, and (B) 2.0 to 25.0% by weight of a polyol to produce a rosin-based support resin having an acid number in the range of 120 to 250; and further reacting the polymerization reaction:

(1) 0.4 to 1.0% by weight of the total composition of an initiator;

(2) 2.0 to 8.0% by weight of the total composition of a surfactant;

(3) 55.0 to 86.6% by weight of the total composition of a non amide-containing monomer;

(4) 1.0 to 6.0% by weight of the total composition of an amide-containing monomer selected from the group consisting of monomers of the formula

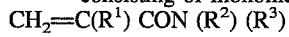
$CH_2=C(R^1) CON (R^2) (R^3)$ where $R^1$ is hydrogen or a methyl group, $R^2$ is hydrogen or a methyl group, and $R^3$ is hydrogen or an alkyl, hydroxyalkyl, alkoxyalkyl, ketoalkyl, or aryl group containing from 1 to 18 carbon atoms, monomers of the formula

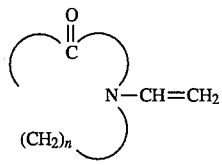

where n is 3, 4, or 5, and combinations thereof;

(5) 9.9 to 22.0% by weight of the total composition of said support resin; and wherein the improvement comprises also reacting in the polymerization reaction from (6) 0.1 to 8.0% by weight of the total composition of a polyvinyl alcohol having a molecular weight average in the range of about 10,000 to about 120,000, and a degree of hydrolysis based on the mole % of between 80 and 100%, to produce the aqueous polymer emulsion product.

13. The method of claim 11 wherein the polyol is selected from the group consisting of glycerol, sorbitol, pentaerythritol, neopentyl glycol, ethylene glycol, polyethylene glycols having an average molecular weight in the range of 100–10,000, and combinations thereof.

14. The method of claim 11 wherein the acid number of the rosin-based support resin in the range of 150 to 200.

15. The method of claim 11 wherein the non amide-containing monomer is selected from the group consisting of styrene, alpha-methyl-styrene, acrylic acid, methacrylic acid, methyl methacrylate, butyl methacrylate, butyl acrylate, 2-ethylhexyl acrylate, ethyl acrylate, hydroxyethyl acrylate, hydroxyethyl methacrylate, polyethylene glycol monomethacrylate, and combinations thereof.

16. The method of claim 11 wherein the amide-containing monomer is selected from the group consisting of acrylamide, methacrylamide, diacetone acrylamide, N-methylolacrylamide, N-isobutoxymethylacrylamide, N-dodecylacrylamide, N,N-dimethylacrylamide, N-vinylpyrrolidinone, N-vinylcaprolactam, and combinations thereof.

17. The method of claim 11 wherein the initiator is selected from the group consisting of ammonium persulfate, potassium persulfate, sodium persulfate, and combinations thereof.

18. The method of claim 11 wherein the surfactant is selected from the group consisting of sulfated alkylphenoxypoly(ethyleneoxy)ethanol, octylphenoxypoly(ethyleneoxy)ethanol, and combinations thereof.

19. The method of claim 11 wherein the pH of the polymer emulsion product is in the range of 8.0 to 9.0.

20. The polymer emulsion product of the method of claim 11.

21. A water-based ink comprising the polymer emulsion product of claim 20 and a pigment dispersion.

\* \* \* \* \*